US010873757B2

(12) United States Patent
Oh et al.

(10) Patent No.: US 10,873,757 B2
(45) Date of Patent: Dec. 22, 2020

(54) METHOD OF ENCODING VIDEO DATA

(71) Applicant: INFOBRIDGE PTE. LTD., Singapore (SG)

(72) Inventors: Soo Mi Oh, Seongnam (KR); Moonock Yang, Singapore (SG)

(73) Assignee: INFOBRIDGE PTE. LTD., Singapore (SG)

(*) Notice: Subject to any disclaimer, the term of this patent is extended or adjusted under 35 U.S.C. 154(b) by 0 days.

(21) Appl. No.: 16/242,546

(22) Filed: Jan. 8, 2019

(65) Prior Publication Data

US 2019/0141349 A1    May 9, 2019

Related U.S. Application Data

(63) Continuation of application No. 15/481,954, filed on Apr. 7, 2017, now Pat. No. 10,212,449, which is a
(Continued)

(30) Foreign Application Priority Data

Nov. 7, 2011    (KR) .................. 10-2011-0115348

(51) Int. Cl.
*H04L 29/08*        (2006.01)
*H04N 19/52*        (2014.01)
(Continued)

(52) U.S. Cl.
CPC ........... *H04N 19/52* (2014.11); *H04N 19/105* (2014.11); *H04N 19/117* (2014.11);
(Continued)

(58) Field of Classification Search
CPC ........ H04N 19/52; H04N 19/13; H04N 19/61; H04N 19/80; H04N 19/105; H04N 19/182;
(Continued)

(56) References Cited

U.S. PATENT DOCUMENTS 5,339,108 A    8/1994    Coleman et al.
5,867,602 A    2/1999    Zandi et al.
(Continued)

FOREIGN PATENT DOCUMENTS

CN    101946516 A    1/2011
JP    5827412 B2    12/2015
(Continued)

OTHER PUBLICATIONS

Matsuo et al, Improved intra angular prediction by dct based interpolation filter (Year: 2012).*
(Continued)

*Primary Examiner* — Shan E Elahi
(74) *Attorney, Agent, or Firm* — Birch, Stewart, Kolasch & Birch, LLP

(57) ABSTRACT

A method of decoding video data in uni-directional prediction by a decoding apparatus can include deriving, by the decoding apparatus, a reference picture index and a motion vector of a current prediction unit; generating, by the decoding apparatus, a prediction block of the current prediction unit using the reference picture index and the motion vector; generating, by the decoding apparatus, a quantized block by inversely scanning quantized coefficient components; generating, by the decoding apparatus, a transformed block by inversely quantizing the quantized block using a quantization parameter; generating, by the decoding apparatus, a residual block by inversely transforming the transformed block; and generating, by the decoding apparatus, reconstructed pixels using the prediction block and the residual block, in which prediction pixels of the prediction block are generated using an interpolation filter selected based on the motion vector, the interpolation filter being a 7-tap filter if the motion vector indicates a quarter pixel position, the
(Continued)

interpolation filter being an 8-tap filter if the motion vector indicates a half pixel position.

9 Claims, 15 Drawing Sheets

Related U.S. Application Data continuation of application No. 14/692,680, filed on Apr. 21, 2015, now Pat. No. 9,648,343, which is a continuation of application No. 14/618,833, filed on Feb. 10, 2015, now Pat. No. 9,351,012, which is a continuation of application No. 14/349,979, filed as application No. PCT/CN2012/084018 on Nov. 2, 2012, now Pat. No. 8,982,957.

(51) Int. Cl.
| | |
|---|---|
| H04N 19/176 | (2014.01) |
| H04N 19/117 | (2014.01) |
| H04N 19/463 | (2014.01) |
| H04N 19/635 | (2014.01) |
| H04N 19/523 | (2014.01) |
| H04N 19/615 | (2014.01) |
| H04N 19/139 | (2014.01) |
| H04N 19/126 | (2014.01) |
| H04N 19/513 | (2014.01) |
| H04N 19/105 | (2014.01) |
| H04N 19/182 | (2014.01) |
| H04N 19/196 | (2014.01) |
| H04N 19/587 | (2014.01) |
| H04N 19/159 | (2014.01) |
| H04N 19/122 | (2014.01) |
| H04N 19/13 | (2014.01) |
| H04N 19/61 | (2014.01) |
| H04N 19/80 | (2014.01) |
| H04N 19/56 | (2014.01) |
| H04N 19/517 | (2014.01) |
| H04N 19/172 | (2014.01) |

(52) U.S. Cl.
CPC ......... *H04N 19/122* (2014.11); *H04N 19/126* (2014.11); *H04N 19/13* (2014.11); *H04N 19/139* (2014.11); *H04N 19/159* (2014.11); *H04N 19/176* (2014.11); *H04N 19/182* (2014.11); *H04N 19/196* (2014.11); *H04N 19/463* (2014.11); *H04N 19/521* (2014.11); *H04N 19/523* (2014.11); *H04N 19/587* (2014.11); *H04N 19/61* (2014.11); *H04N 19/615* (2014.11); *H04N 19/635* (2014.11); *H04N 19/80* (2014.11); *H04N 19/172* (2014.11); *H04N 19/517* (2014.11); *H04N 19/56* (2014.11)

(58) Field of Classification Search
CPC .. H04N 19/196; H04N 19/587; H04N 19/159; H04N 19/122; H04N 19/126; H04N 19/521; H04N 19/176; H04N 19/117; H04N 19/463; H04N 19/635; H04N 19/523; H04N 19/615; H04N 19/139; H04N 19/172; H04N 19/56; H04N 19/517; H04N 19/513; H04N 19/124; H04N 19/129
USPC .................................................. 375/240.17
See application file for complete search history.

(56) References Cited

U.S. PATENT DOCUMENTS

| | | | |
|---|---|---|---|
| 5,881,176 A | 3/1999 | Keith et al. | |
| 5,982,935 A | 11/1999 | Arbel | |
| 7,305,034 B2 | 12/2007 | Srinivasan | |
| 7,620,109 B2 | 11/2009 | Srinivasan | |
| 8,275,036 B2 | 9/2012 | Etoh et al. | |
| 8,325,807 B2* | 12/2012 | Nilsson | H04N 19/159 375/240.13 |
| 8,498,338 B1 | 7/2013 | Wang et al. | |
| 8,743,949 B2 | 6/2014 | Srinivasan et al. | |
| 8,787,443 B2 | 7/2014 | Sun et al. | |
| 8,908,768 B2 | 12/2014 | Hsu et al. | |
| 8,982,957 B2 | 3/2015 | Oh et al. | |
| 9,258,570 B2 | 2/2016 | Srinivasan et al. | |
| 9,432,686 B2 | 8/2016 | Hsu et al. | |
| 2002/0090207 A1 | 7/2002 | Mishima et al. | |
| 2003/0026335 A1 | 2/2003 | Thyagarajan | |
| 2003/0048208 A1* | 3/2003 | Karczewicz | H04N 19/61 341/67 |
| 2004/0008784 A1 | 1/2004 | Kikuchi et al. | |
| 2005/0207495 A1 | 9/2005 | Ramasastry et al. | |
| 2006/0133481 A1 | 6/2006 | Chujoh | |
| 2006/0294171 A1 | 12/2006 | Bossen et al. | |
| 2007/0081587 A1 | 4/2007 | Raveendran et al. | |
| 2007/0121731 A1 | 5/2007 | Tanizawa et al. | |
| 2007/0189626 A1 | 8/2007 | Tanizawa et al. | |
| 2007/0217507 A1 | 9/2007 | Kazui et al. | |
| 2007/0274385 A1 | 11/2007 | He | |
| 2008/0063068 A1 | 3/2008 | Sekiguchi et al. | |
| 2008/0170611 A1* | 7/2008 | Ramaswamy | H04N 19/61 375/240.01 |
| 2009/0067503 A1 | 3/2009 | Jeong et al. | |
| 2009/0080521 A1 | 3/2009 | Marpe et al. | |
| 2009/0116555 A1 | 5/2009 | Oishi | |
| 2009/0141804 A1 | 6/2009 | Zhao et al. | |
| 2009/0213930 A1 | 8/2009 | Ye et al. | |
| 2009/0220005 A1 | 9/2009 | Kim et al. | |
| 2010/0086028 A1 | 4/2010 | Tanizawa et al. | |
| 2010/0135389 A1 | 6/2010 | Tanizawa et al. | |
| 2010/0150241 A1* | 6/2010 | Nilsson | H04N 19/159 375/240.16 |
| 2010/0262712 A1 | 10/2010 | Kim et al. | |
| 2012/0075436 A1* | 3/2012 | Chen | H04N 13/161 348/51 |
| 2012/0082215 A1 | 4/2012 | Sze et al. | |
| 2012/0082219 A1 | 4/2012 | Sun et al. | |
| 2012/0140822 A1 | 6/2012 | Wang et al. | |
| 2012/0170650 A1 | 7/2012 | Chong et al. | |
| 2012/0195378 A1 | 8/2012 | Zheng et al. | |
| 2012/0219064 A1 | 8/2012 | Zheng et al. | |
| 2012/0314027 A1 | 12/2012 | Tian et al. | |
| 2012/0328028 A1 | 12/2012 | Sadafale | |
| 2013/0033612 A1 | 2/2013 | Wu et al. | |
| 2013/0051475 A1* | 2/2013 | Joshi | H04N 19/129 375/240.18 |
| 2013/0083844 A1* | 4/2013 | Chong | H04N 19/463 375/240.02 |
| 2013/0083853 A1 | 4/2013 | Coban et al. | |
| 2013/0089145 A1* | 4/2013 | Guo | H04N 19/122 375/240.12 |
| 2013/0094569 A1* | 4/2013 | Chong | H04N 19/176 375/240.02 |
| 2013/0094952 A1 | 4/2013 | Zhou | |
| 2013/0101033 A1 | 4/2013 | Joshi et al. | |
| 2013/0301704 A1 | 11/2013 | Srinivasan et al. | |
| 2013/0301732 A1 | 11/2013 | Hsu et al. | |
| 2013/0322545 A1 | 12/2013 | Kondow | |
| 2013/0329782 A1 | 12/2013 | Seregin et al. | |
| 2014/0161175 A1* | 6/2014 | Zhang | H04N 19/176 375/240.02 |
| 2014/0219339 A1 | 8/2014 | Park | |
| 2014/0269926 A1 | 9/2014 | Oh et al. | |
| 2015/0156510 A1 | 6/2015 | Oh et al. | |
| 2015/0229950 A1 | 8/2015 | Oh et al. | |
| 2015/0229951 A1 | 8/2015 | Oh et al. | |

(56) References Cited

U.S. PATENT DOCUMENTS

| | | | |
|---|---|---|---|
| 2015/0229952 | A1 | 8/2015 | Oh et al. |
| 2015/0229953 | A1 | 8/2015 | Oh et al. |
| 2016/0191946 | A1 | 6/2016 | Zhou et al. |

FOREIGN PATENT DOCUMENTS

| | | |
|---|---|---|
| JP | 2016-28516 A | 2/2016 |
| JP | 2016-28517 A | 2/2016 |
| JP | 2016-28518 A | 2/2016 |
| JP | 2016-28519 A | 2/2016 |

OTHER PUBLICATIONS

Bross et al., "High efficiency video coding (HEVC) text specification draft 6", Joint Collaborative Team on Video Coding (JCT-VC) of ITU-T SG16 WP3 and ISO/IEC JTC1/SC29/WG11, 8th Meeting, JCTVC-H1003, Feb. 1-10, 2012, San José, CA.

Alexander Alshin et al., "CE3: DCT derived interpolation falter test by Samsung", Joint Collaborative Team on Video Coding (JCT-VC) of ITU-T SG16 WP3 and ISO/IEC JTC1/SC29/WG11 6th Meeting, Jul. 14-22, 2011, pp. 2-11, JCTVC-F247.

Bin Li et al., "Redundancy reduction in Cbf and Merging coding", Joint Collaborative Team on Video Coding (JCT-VC) of ITU-T SG16 WP3 and ISO/IEC JTC1/SC29/WG11 3rd Meeting, Oct. 7-15, 2010, pp. 1-8, JCTVC-C277.

Bross et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, JCTVC-H1003, 7th Meeting, Geneva, CH, Nov. 21-30, 2011, 275 pages.

Bross et al., "High efficiency video coding (HEVC) text specification draft 6," Joint Collaborative Team on Video Coding (JCT-VC) of ITU-T SG16 WP3 and ISO/IEC JTC1/SC29/WG11, Document: JCTVC-H1003, 7th Meeting, Geneva, CH, Nov. 21-30, 2011, pp. 1-251 (275 pages total).

Hirofumi Aoki et al., "CE4 Subtest 2: QP prediction based on intra/inter prediction (test 2.4.b)", JCTVC-F103, Jul. 14-22, 2011, pp. 1-19.

Hirofumi Aoki et al., "CE4 Subtest 2: Spatial QP prediction: combination of test 2.3.g 2.3.f and 2.3.e", Joint Collaborative Team on Video Coding (JCT-VC) of ITU-T SG16 WP3 and ISO/IEC JTC1/SC29/WG11 6th Meeting, Jul. 14-22, 2011, pp. 2-11, JCTVC-F661.

International Search Report for PCT/CN2012/084018, filed Nov. 2, 2012.

Kenji Kondo et al., "Improvement of delta-QP Coding", Joint Collaborative Team on Video Coding (JCT-VC) of ITU-T SG16 WP3 and ISO/IEC JTC1/SC29/WG11 6th Meeting, Jul. 14-22, 2011, pp. 2-9, JCTVC-F422r1.

Kobayashi et al., "Sub-LCU level delta QP signaling," Joint Collaborative Team on Video Coding (JCT-VC) of ITU-T SG16 WP3 and ISO/IEC JTC1/SC29/WG11, Document: JCTVC-E198, 5th Meeting, Genève, CH, Mar. 16-23, 2011, pp. 1-9.

Li et al., "Integration of Plane Mode with Multiple Predictor Sets in Intra Prediction for Video Coding", IEEE, 2011, pp. 617-620.

Lou et al., "CE3: Fixed interpolation filter tests by Motorola Mobility," Joint Collaborative Team on Video Coding (JCT-VC) of ITU-T SG16 WP3 and ISO/IEC JTC1/SC29/WG11, Document: JCTVC-F574, 6th Meeting, Torino, IT, Jul. 14-22, 2011, pp. 1-10.

Masaaki Kobayashi et al., "CE4 Subtest 2: Delta QP prediction results of test 2.2.b and 2.3.f", JCTVC-F300, Jul. 14-22, 2011, pp. 1-8.

McCann et al., "HM3: High Efficiency Video Coding (HEVC) Test Model 3 Encoder Description", Joint Collaborative Team on Video Coding (JCT-VC) of ITU-T SG16 WP3 and ISO/IEC JTC1/SC29/WG11, JCTVC-E602, 5th Meeting: Geneva, CH, Mar. 16-23, 2011, 34 pages.

Nakamura et al., "Non-CE4: Compatible QP prediction with RC and AQ," Joint Collaborative Team on Video Coding (JCT-VC) of ITU-T SG16 WP3 and ISO/IEC JTC1/SC29/WG11, Document: JCTVC-H0204, 8th Meeting, San José, CA, USA, Feb. 1-10, 2012, pp. 1-15.

Sato, "CE4: Result of 2.3.d and 2.3.e," Joint Collaborative Team on Video Coding (JCT-VC) of ITU-T SG16 WP3 and ISO/IEC JTC1/SC29/WG11, Document: JCTVC-F420r1, 6th Meeting, Torino, IT, Jul. 14-22, 2011, pp. 1-5.

Ye et al., "Improved H.264 Intra Coding Based on Bi-Directional Intra Prediction, Directional Transform, and Adaptive Coefficient Scanning", IEEE, ICIP 2008, pp. 2116-2119.

\* cited by examiner

FIG. 3

| | | | | A0 | $a_{A0}$ | $b_{A0}$ | $c_{A0}$ | | | | |
|---|---|---|---|---|---|---|---|---|---|---|---|
| | | | | | | | | | | | |
| | | | | | | | | | | | |
| | | | | | | | | | | | |
| L1 | | | | L0 | $a_{L0}$ | $b_{L0}$ | $c_{L0}$ | R0 | | | R1 |
| $d_{L1}$ | | | | $d_{L0}$ | $e_{L0}$ | $f_{L0}$ | $g_{L0}$ | $d_{R0}$ | | | $d_{R1}$ |
| $h_{L1}$ | | | | $h_{L0}$ | $i_{L0}$ | $j_{L0}$ | $k_{L0}$ | $h_{R0}$ | | | $h_{R1}$ |
| $n_{L1}$ | | | | $n_{L0}$ | $p_{L0}$ | $q_{L0}$ | $r_{L0}$ | $n_{R0}$ | | | $n_{R1}$ |
| | | | | B0 | $a_{B0}$ | $b_{B0}$ | $c_{B0}$ | | | | |
| | | | | | | | | | | | |
| | | | | | | | | | | | |
| | | | | | | | | | | | |
| | | | | B1 | $a_{B1}$ | $b_{B1}$ | $c_{B1}$ | | | | |

METHOD OF ENCODING VIDEO DATA

CROSS-REFERENCE TO RELATED APPLICATIONS

This application is a continuation of U.S. patent application Ser. No. 15/481,954 filed on Apr. 7, 2017, which is a continuation of U.S. patent application Ser. No. 14/692,680 filed on Apr. 21, 2015 (now U.S. Pat. No. 9,648,343 issued May 9, 2017), which is a continuation of U.S. patent application Ser. No. 14/618,833 filed on Feb. 10, 2015 (now U.S. Pat. No. 9,351,012 issued May 24, 2016), which is a continuation of U.S. patent application Ser. No. 14/349,979 filed on Apr. 4, 2014 (now U.S. Pat. No. 8,982,957 issued Mar. 17, 2015), which is a National Stage of International Patent Application No. PCT/CN2012/084018 filed on Nov. 2, 2012, which claims priority to Korean Patent Application No. 10-2011-0115348 filed on Nov. 7, 2011. The contents of all of these applications are hereby incorporated by reference as fully set forth herein in their entirety.

BACKGROUND OF THE INVENTION

Field of the Invention

The present invention relates to a method of decoding video data, and more particularly, to a method of deriving motion information in merge mode by constructing a merge candidate list using spatial and temporal merge candidates and generating a prediction block using the motion information.

Discussion of the Related Art

Methods for compressing video data include MPEG-2, MPEG-4 and H.264/MPEG-4 AVC. According to these methods, one picture is divided into macroblocks to encode an image, the respective macroblocks are encoded by generating a prediction block using inter prediction or intra prediction. The difference between an original block and the prediction block is transformed to generate a transformed block, and the transformed block is quantized using a quantization parameter and one of a plurality of predetermined quantization matrices. The quantized coefficient of the quantized block are scanned by a predetermined scan type and then entropy-coded. The quantization parameter is adjusted per macroblock and encoded using a previous quantization parameter.

In H.264/MPEG-4 AVC, motion estimation is used to eliminate temporal redundancy between consecutive pictures. To detect the temporal redundancy, one or more reference pictures are used to estimate motion of a current block, and motion compensation is performed to generate a prediction block using motion information. The motion information includes one or more reference picture indexes and one or more motion vectors.

According to the H.264/MPEG-4 AVC, only the motion vectors are predicted and encoded using neighboring motion vectors, and the reference picture indexes are encoded without neighboring reference picture indexes. Also, the computational complexity for generating a prediction block is high because the prediction block is interpolated using a long-tap filter.

However, if various sizes are used for inter prediction, the correlation between motion information of a current block and motion information of one or more neighboring block increases. The correlation between motion vector of a current block and motion vector of neighboring block within a reference picture becomes higher as the picture size becomes larger if motion of image is almost constant or slow. Accordingly, the conventional compression method described above decreases compression efficiency of motion information if the picture size is larger than that of high-definition picture and various sizes are allowed for motion estimation and motion compensation.

SUMMARY OF THE INVENTION

The present invention is directed to a method of decoding video data by deriving motion information by constructing a merge candidate list using spatial merge candidates and temporal candidate and generating prediction block using a filter determined by the motion vector.

One aspect of the present invention provides a method of decoding video data, comprising: deriving a reference picture index and a motion vector of a current prediction unit; generating a prediction block of the current prediction unit using the reference picture index and the motion vector; generating a quantized block by inverse-scanning quantized coefficient components; generating a transformed block by inverse-quantizing the quantized block using a quantization parameter; generating a residual block by inverse-transforming the transformed block; and generating a reconstructed pixels using the prediction block and the residual block. Prediction pixels of the prediction block is generated using an interpolation filter selected based on the motion vector.

A method according to the present invention derives a reference picture index and a motion vector of a current prediction unit, generates a prediction block of the current prediction unit using the reference picture index and the motion vector, generating a residual block by inverse-scan, inverse-quantization and inverse transform, and generates reconstructed pixels using the prediction block and the residual block. Prediction pixels of the prediction block is generated using an interpolation filter selected based on the motion vector. Accordingly, the coding efficiency of the motion information is improved by including various merge candidates. Also, the computational complexity of an encoder and a decoder is reduced by selecting different filter according to location of the prediction pixels determined by the motion vector.

BRIEF DESCRIPTION OF THE DRAWINGS

FIG. 3 is a conceptual diagram illustrating pixel positions indicated by a motion vector according to the present invention.

DETAILED DESCRIPTION OF THE INVENTION

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

An image encoding apparatus and an image decoding apparatus according to the present invention may be a user terminal such as a personal computer, a personal mobile terminal, a mobile multimedia player, a smartphone or a wireless communication terminal. The image encoding device and the image decoding device may be include a communication unit for communicating with various devices, a memory for storing various programs and data used to encode or decode images.

Figure 1:
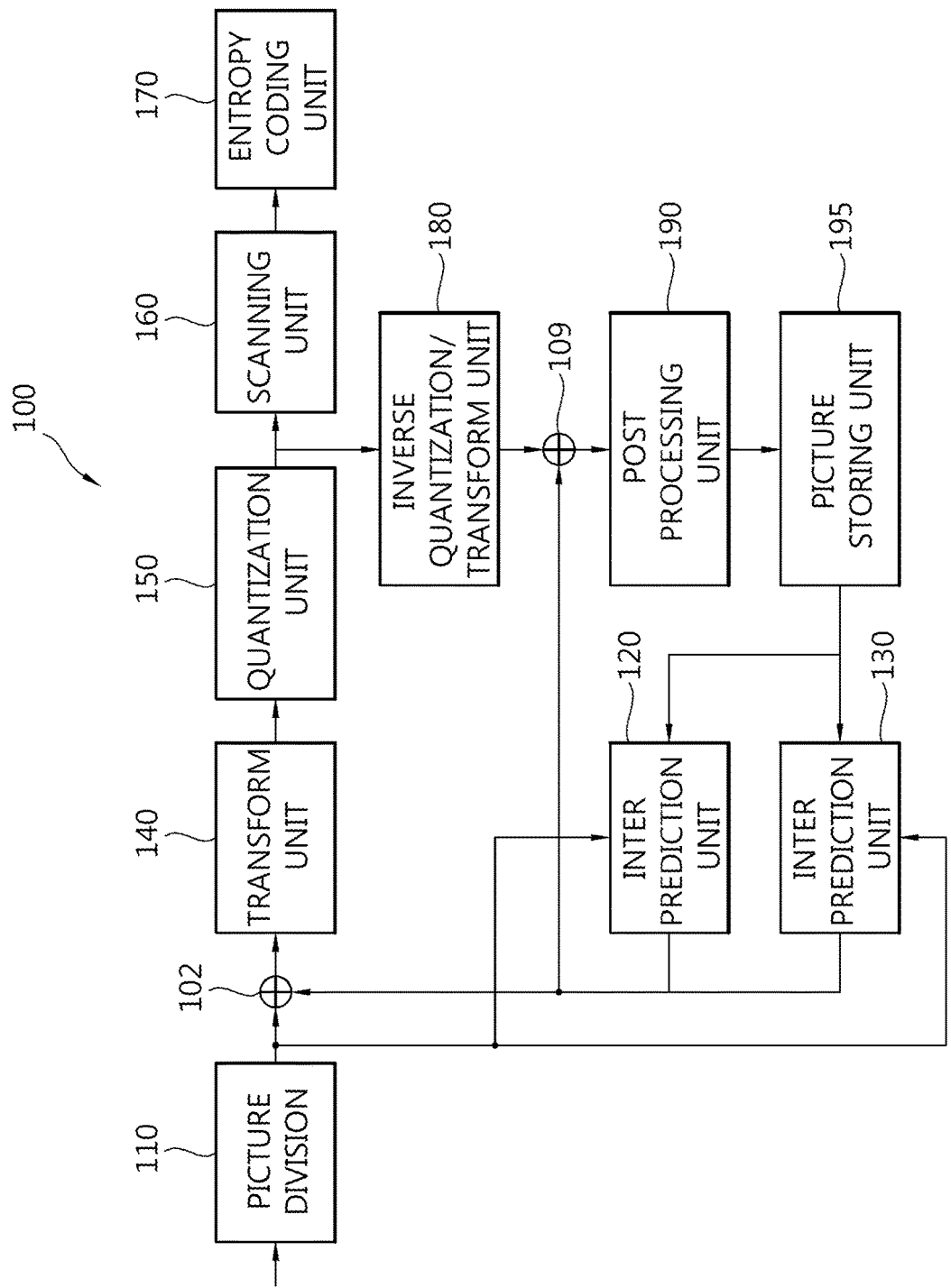
FIG. 1 is a block diagram of an image coding apparatus according to the present invention.

FIG. 1 is a block diagram of an image coding apparatus 100 according to the present invention.

Referring to FIG. 1, the image coding apparatus 100 according to the present invention includes a picture division unit 110, an intra prediction unit 120, an inter prediction unit 130, a transform unit 140, a quantization unit 150, a scanning unit 160, an entropy coding unit 170, an inverse quantization/transform unit 180, a post-processing unit 190 and a picture storing unit 195.

The picture division unit 110 divides a picture or a slice into plural largest coding units (LCUs), and divides each LCU into one or more coding units. The size of LCU may be 32×32, 64×64 or 128×128. The picture division unit 110 determines prediction mode and partitioning mode of each coding unit.

An LCU includes one or more coding units. The LCU has a recursive quad tree structure to specify a division structure of the LCU. Parameters for specifying the maximum size and the minimum size of the coding unit are included in a sequence parameter set. The division structure is specified by one or more split coding unit flags (split_cu_flags). The size of a coding unit is 2N×2N. If the size of the LCU is 64×64 and the size of a smallest coding unit (SCU) is 8×8, the size of the coding unit may be 64×64, 32×32, 16×16 or 8×8.

A coding unit includes one or more prediction units. In intra prediction, the size of the prediction unit is 2N×2N or N×N. In inter prediction, the size of the prediction unit is specified by the partitioning mode. The partitioning mode is one of 2N×2N, 2N×N, N×2N and N×N if the coding unit is partitioned symmetrically. The partitioning mode is one of 2N×nU, 2N×nD, nL×2N and nR×2N if the coding unit is partitioned asymmetrically. The partitioning modes are allowed based on the size of the coding unit to reduce complexity of hardware. If the coding unit has a minimum size, the asymmetric partitioning is not allowed. Also, if the coding unit has the minimum size, N×N partitioning mode may not be allowed.

A coding unit includes one or more transform units. The transform unit has a recursive quad tree structure to specify a division structure of the coding unit. The division structure is specified by one or more split transform unit flags (split_tu_flags). Parameters for specifying the maximum size and the minimum size of the luma transform unit are included in a sequence parameter set.

The intra prediction unit 120 determines an intra prediction mode of a current prediction unit and generates a prediction block using the intra prediction mode.

The inter prediction unit 130 determines motion information of a current prediction unit using one or more reference pictures stored in the picture storing unit 195, and generates a prediction block of the prediction unit. The motion information includes one or more reference picture indexes and one or more motion vectors.

The transform unit 140 transforms a residual block to generate a transformed block. The residual block has the same size of the transform unit. If the prediction unit is larger than the transform unit, the residual signals between the current block and the prediction block are partitioned into multiple residual blocks.

The quantization unit 150 determines a quantization parameter for quantizing the transformed block. The quantization parameter is a quantization step size. The quantization parameter is determined per quantization unit. The size of the quantization unit may vary and be one of allowable sizes of coding unit. If a size of the coding unit is equal to or larger than a minimum size of the quantization unit, the coding unit becomes the quantization unit. A plurality of coding units may be included in a quantization unit of minimum size. The minimum size of the quantization unit is determined per picture and a parameter for specifying the minimum size of the quantization unit is included in a picture parameter set.

The quantization unit 150 generates a quantization parameter predictor and generates a differential quantization parameter by subtracting the quantization parameter predictor from the quantization parameter. The differential quantization parameter is entropy-coded.

The quantization parameter predictor is generated by using quantization parameters of neighboring coding units and a quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameters are available, an average of the left and above quantization parameters is set as the quantization parameter predictor. If only one of the left and above quantization parameters is available, an average of the available quantization parameter and the previous quantization parameters is set as the quantization parameter predictor. If both of the left and above quantization parameters are unavailable, the previous quantization parameter is set as the quantization parameter predictor. The average is rounded off.

The differential quantization parameter is converted into bins for the absolute value of the differential quantization parameter and a bin for indicating sign of the differential quantization parameter through a binarization process, and the bins are arithmetically coded. If the absolute value of the differential quantization parameter is 0, the bin for indicating sign may be omitted. Truncated unary is used for binarization of the absolute.

The quantization unit 150 quantizes the transformed block using a quantization matrix and the quantization parameter to generate a quantized block. The quantized block is provided to the inverse quantization/transform unit 180 and the scanning unit 160.

The scanning unit 160 determines applies a scan pattern to the quantized block.

In inter prediction, a diagonal scan is used as the scan pattern if CABAC is used for entropy coding. The quantized coefficients of the quantized block are split into coefficient components. The coefficient components are significant flags, coefficient signs and coefficient levels. The diagonal scan is applied to each of the coefficient components. The significant coefficient indicates whether the corresponding quantized coefficient is zero or not. The coefficient sign indicates a sign of non-zero quantized coefficient, and the coefficient level indicates an absolute value of non-zero quantized coefficient.

When the size of the transform unit is larger than a predetermined size, the quantized block is divided into multiple subsets and the diagonal scan is applied to each subset. Significant flags, coefficient signs and coefficients levels of each subset are scanned respectively according to the diagonal scan. The predetermined size is 4×4. The subset is a 4×4 block containing 16 transform coefficients.

The scan pattern for scanning the subsets is the same as the scan pattern for scanning the coefficient components. The significant flags, the coefficient signs and the coefficients levels of each subset are scanned in the reverse direction. The subsets are also scanned in the reverse direction.

A parameter indicating last non-zero coefficient position is encoded and transmitted to a decoding side. The parameter indicating last non-zero coefficient position specifies a position of last non-zero quantized coefficient within the quantized block. A non-zero subset flag is defined for each subset other than the first subset and the last subset and is transmitted to the decoding side. The first subset covers a DC coefficient. The last subset covers the last non-zero coefficient. The non-zero subset flag indicates whether the subset contains non-zero coefficients or not.

The entropy coding unit 170 entropy-codes the scanned component by the scanning unit 160, intra prediction information received from the intra prediction unit 120, motion information received from the inter prediction unit 130, and so on.

The inverse quantization/transform unit 180 inversely quantizes the quantized coefficients of the quantized block, and inversely transforms the inverse quantized block to generate residual signals.

The post-processing unit 190 performs a deblocking filtering process for removing blocking artifact generated in a reconstructed picture.

The picture storing unit 195 receives post-processed image from the post-processing unit 190, and stores the image in picture units. A picture may be a frame or a field.

Figure 2:
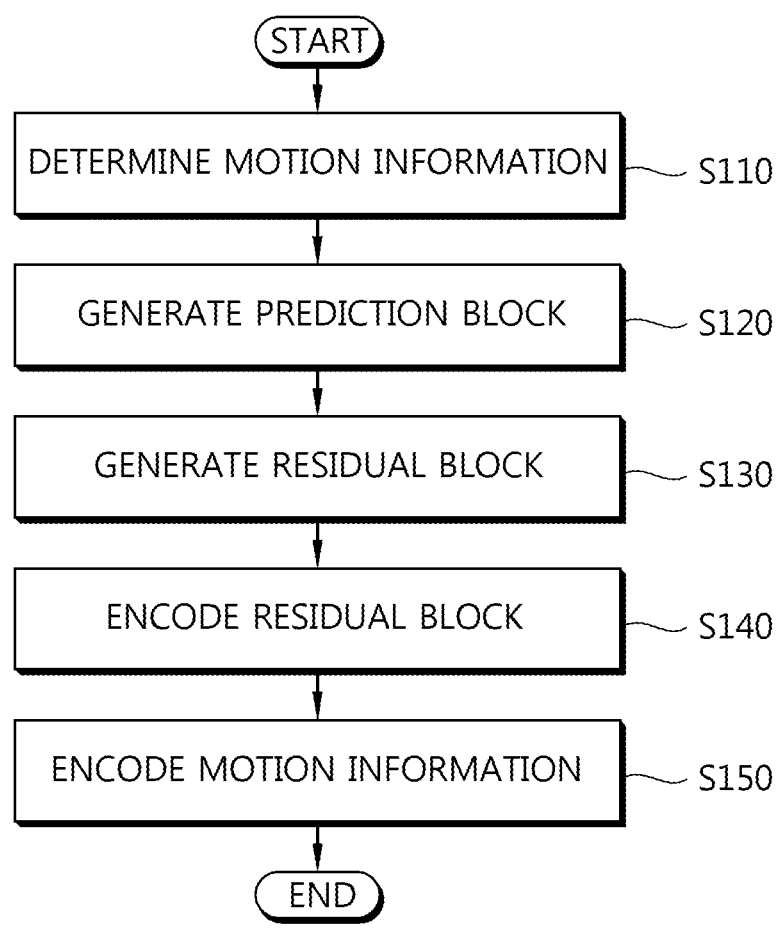
FIG. 2 is a flow chart illustrating a method of encoding video data in an inter prediction mode according to the present invention.

FIG. 2 is a flow chart illustrating a method of encoding video data in an inter prediction mode according to the present invention.

Motion information of a current block is determined (S110). The current block is a prediction unit. A size of the current block is determined by a size and a partitioning mode of the coding unit.

The motion information varies according to a prediction type. If the prediction type is a uni-directional prediction, the motion information includes a reference index specifying a picture of a reference list 0, and a motion vector. If the prediction type is a bi-directional prediction, the motion information includes two reference indexes specifying a picture of a reference list 0 and a picture of a reference list 1, and a list 0 motion vector and a list 1 motion vector.

A prediction block of the current block is generated using the motion information (S120).

If the motion vector indicates an integer-pixel location, the prediction block is generated by copying a block of the reference picture specified by the motion vector. If the motion vector indicates a sub-pixel location, the prediction block is generated by interpolating the pixels of the reference picture. The motion vector is given in quarter-pixel units.

FIG. 3 is a conceptual diagram illustrating pixel positions indicated by a motion vector according to the present invention.

In FIG. 3, the pixels labeled with L0, R0, R1, L1, A0 and B0 are integer position pixels of the reference picture and the pixels labeled with $a_{L0}$ to $r_{L0}$ at sub-pixel locations are fractional pixels to be interpolated using an interpolation filter which is selected based on the motion vector.

If a pixel to be interpolated is located at a sub-pixel location $a_{L0}$, $b_{L0}$ or $c_{L0}$, the pixel labeled with $a_{L0}$, $b_{L0}$ or $c_{L0}$ is generated by applying an interpolation filter to horizontally nearest integer position pixels. If a pixel to be interpolated is located at a sub-pixel location $d_{L0}$, $h_{L0}$ or $n_{L0}$, the pixel labeled with $d_{L0}$, $h_{L0}$ or $n_{L0}$ is generated by applying an interpolation filter to vertically nearest integer position pixels. If a pixel to be interpolated is located at a sub-pixel location $e_{L0}$, $i_{L0}$ or $p_{L0}$, the pixel labeled with $e_{L0}$, $i_{L0}$ or $p_{L0}$ is generated by applying an interpolation filter to vertically nearest interpolated pixels each of which includes a character 'a' within its label. If a pixel to be interpolated is located at a sub-pixel location $g_{L0}$, $k_{L0}$ or $r_{L0}$, the pixel labeled with $g_{L0}$, $k_{L0}$ or $r_{L0}$ is generated by applying an interpolation filter to vertically nearest interpolated pixels each of which includes a character 'c' within its label. If a pixel to be interpolated is located at a sub-pixel location $f_{L0}$, $j_{L0}$ or $q_{L0}$, the pixel labeled with $f_{L0}$, $j_{L0}$ or $q_{L0}$ is generated by applying an interpolation filter to vertically neighboring interpolated pixels each of which includes a character 'c' within its label.

The interpolation filter is determined based on the sub-pixel location of the pixel to be interpolated, or based on a prediction mode and a sub-pixel location of the pixel to be interpolated.

Table 1 shows exemplary filters. The sub-pixel location H indicates a half-pixel location in interpolation direction. For example, the locations $b_{L0}$, $h_{L0}$, $i_{L0}$, $j_{L0}$, and $k_{L0}$ correspond to the sub-pixel location H. The sub-pixel locations FL and FR indicate a quarter-pixel location in interpolation direction. For example, the locations $a_{L0}$, $d_{L0}$, $e_{L0}$, $f_{L0}$, and $g_{L0}$ correspond to the sub-pixel location FL, and the locations $c_{L0}$, $n_{L0}$, $p_{L0}$, $q_{L0}$, and $r_{L0}$ correspond to the sub-pixel location FR.

TABLE 1

| Prediction mode | Sub-Pixel Location | Filter coefficient |
| --- | --- | --- |
| Uni-directional prediction | H | {2, −8, 36, 36, −8, 2} |
| | FL | {−3, 51, 20, −7, 2} |
| | FR | {2, −7, 20, 51, −3} |
| Bi-directional prediction | H | {−1, 4, −11, 40, 40, −11, 4, −1} |
| | FL | {−1, 4, −10, 57, 19, −7, 3, −1} |
| | FR | {−1, 3, −7, 19, 57, −10, 4, −1} |

As shown in Table 1, in uni-directional prediction, 6-tap symmetry filter may be used to interpolate pixels of half-pixel location H, and 5-tap asymmetry filter may be used to interpolate pixels of quarter-pixel location FL or FR. In bi-directional prediction, 8-tap symmetry filter may be used for the half-pixel location H and 8-tap asymmetry filter may be used for the quarter-pixel location FL and FR.

Alternatively, the filter may be determined by only the sub-pixel location of the pixel to be interpolated. In uni-directional prediction, 8-tap symmetry filter may be used to interpolate pixels of half-pixel locations and 7-tap asymmetry filter or 6-tap asymmetry filter may be used to interpolate pixels of quarter-pixel locations. In bi-directional prediction, same filter or another filter having smaller number of taps may be used to interpolate pixels of sub-pixel locations.

A residual block is generated using the current block and the prediction block (S130). The residual block has the same size of the transform unit. If the prediction unit is larger than the transform unit, the residual signals between the current block and the prediction block are into multiple residual blocks.

The residual block is encoded (S140). The residual block is encoded by the transform unit 140, the quantization unit 150, the scanning unit 160 and the entropy coding unit 170 of FIG. 1.

The motion information is encoded (S150). The motion information may be encoded predictively using spatial candidates and a temporal candidate of the current block. The motion information is encoded in a skip mode, a merge mode or an AMVP mode. In the skip mode, the prediction unit has the size of coding unit and the motion information is encoded using the same method as that of the merge mode. In the merge mode, the motion information of the current prediction unit is equal to motion information of one candidate. In the AMVP mode, the motion vector of the motion information is predictively coded using one or more motion vector candidate.

Figure 4:
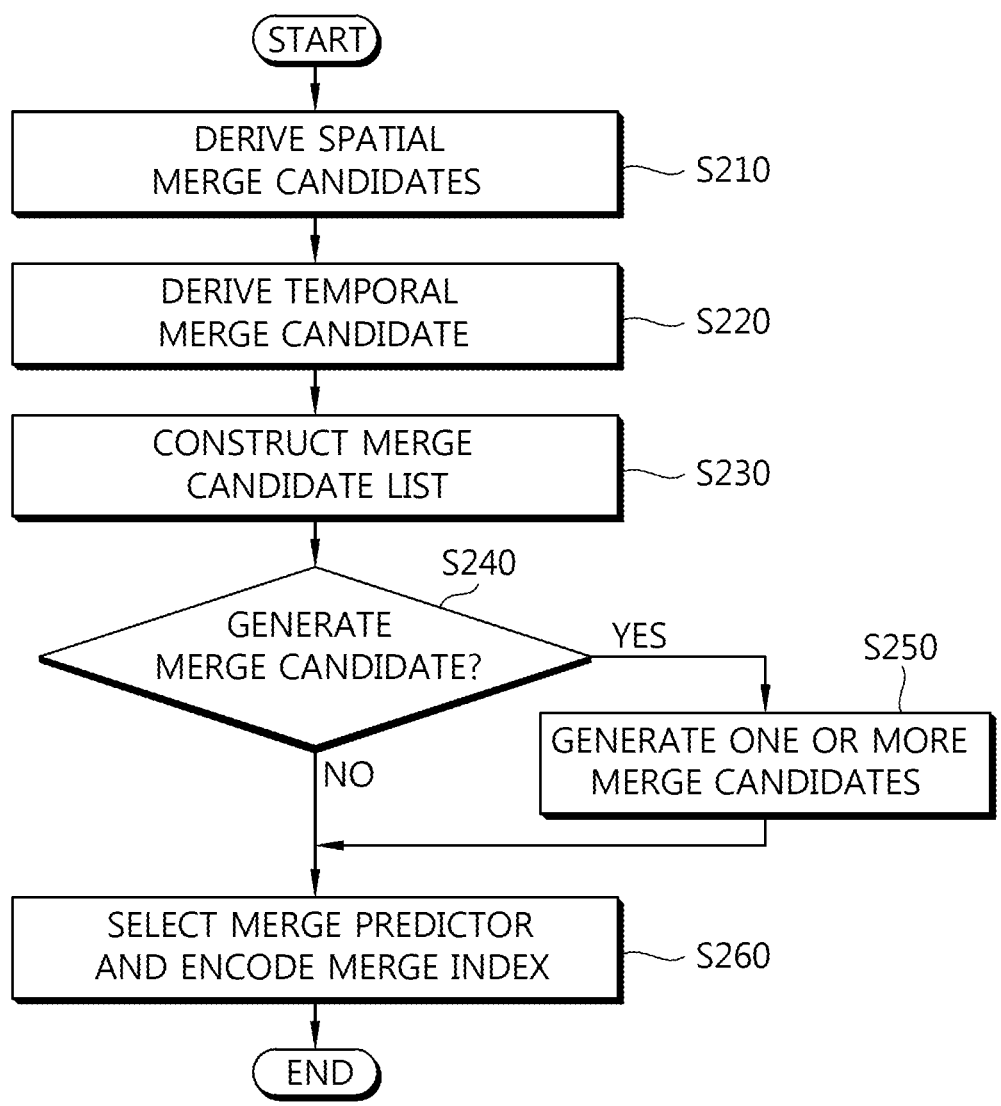
FIG. 4 is a flow chart illustrating a method of encoding motion information in a merge mode according to the present invention.

FIG. 4 is a flow chart illustrating a method of encoding motion information in the merge mode according to the present invention.

Figure 5:
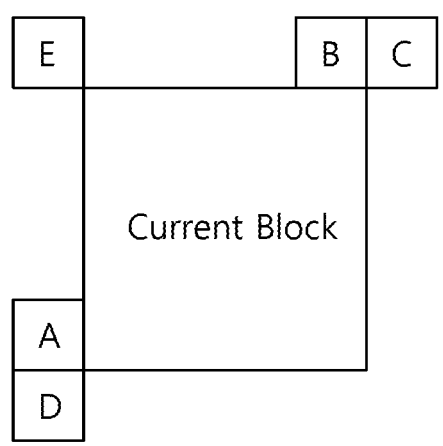
FIG. 5 is a conceptual diagram illustrating positions of spatial merge candidate blocks according to the present invention.

Spatial merge candidates are derived (S210). FIG. 5 is a conceptual diagram illustrating positions of spatial merge candidate blocks according to the present invention.

As shown in FIG. 5, the merge candidate block is a left block (block A), an above block (block B), an above-right block (block C), a left-below block (block D) or an above-left block (block E) of the current block. The blocks are prediction blocks. The above-left block (block E) is set as merge candidate block when one or more of the blocks A, B, C and D are unavailable. The motion information of an available merge candidate block N is set as a spatial merge candidate N. N is A, B, C, D or E.

The spatial merge candidate may be set as unavailable according to the shape of the current block and the position of the current block. For example, if the coding unit is split into two prediction units (block P0 and block P1) using asymmetric partitioning, it is probable that the motion information of the block P0 is not equal to the motion information of the block P1. Therefore, if the current block is the asymmetric block P1, the block P0 is set as unavailable candidate block as shown in FIGS. 6 to 9.

Figure 6:
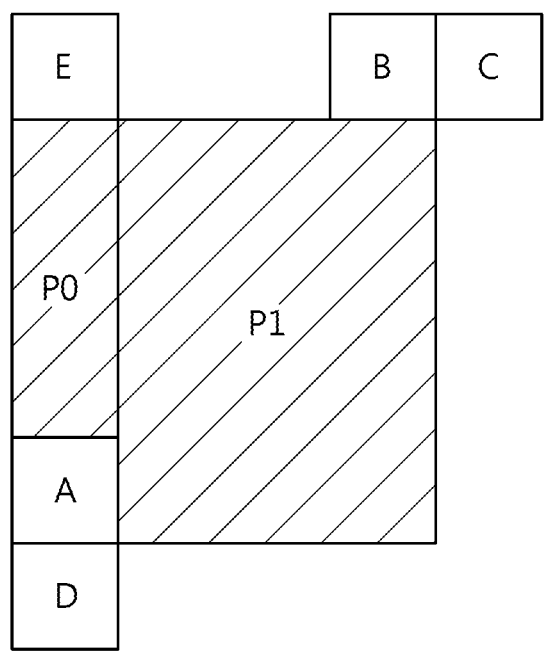
FIG. 6 is a conceptual diagram illustrating positions of spatial merge candidate blocks in an asymmetric partitioning mode according to the present invention.

FIG. 6 is a conceptual diagram illustrating positions of spatial merge candidate blocks in an asymmetric partitioning mode according to the present invention.

As shown in FIG. 6, a coding unit is partitioned into two asymmetric prediction blocks P0 and P1 and the partitioning mode is an nL×2N mode. The size of the block P0 is hN×2N and the size of the block P1 is (2−h)N×2N. The value of h is ½. The current block is the block P1. The blocks A, B, C, D and E are spatial merge candidate blocks. The block P0 is the spatial merge candidate block A.

In present invention, the spatial merge candidate A is set as unavailable not to be listed on the merge candidate list. Also, the spatial merge candidate block B, C, D or E having the same motion information of the spatial merge candidate block A is set as unavailable.

Figure 7:
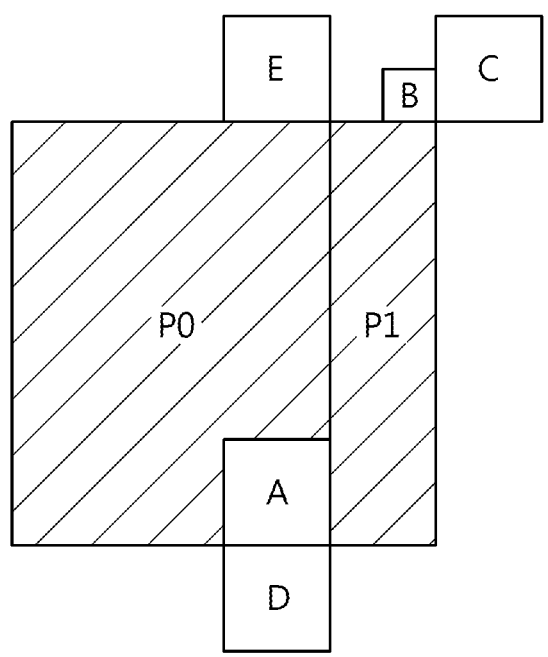
FIG. 7 is another conceptual diagram illustrating positions of spatial merge candidate blocks in another asymmetric partitioning mode according to the present invention.

FIG. 7 is another conceptual diagram illustrating positions of spatial merge candidate blocks in an asymmetric partitioning mode according to the present invention.

As shown in FIG. 7, a coding unit is partitioned into two asymmetric prediction blocks P0 and P1 and the partitioning mode is an nR×2N mode. The size of the block P0 is (2−h)N×2N and the size of the block P1 is hN×2N. The value of h is ½. The current block is the block P1. The blocks A, B, C, D and E are spatial merge candidate blocks. The block P0 is the spatial merge candidate block A.

In present invention, the spatial merge candidate A is set as unavailable not to be listed on the merge candidate list. Also, the spatial merge candidate block B, C, D or E having the same motion information of the spatial merge candidate block A is set as unavailable.

Figure 8:
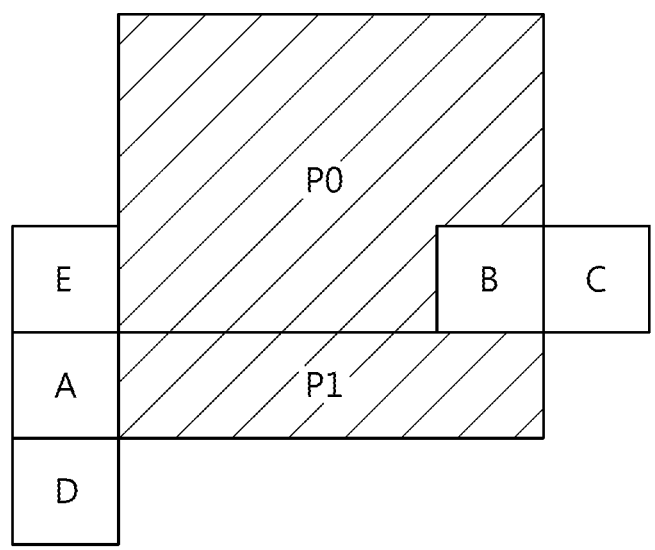
FIG. 8 is another conceptual diagram illustrating positions of spatial merge candidate blocks in another asymmetric partitioning mode according to the present invention.

FIG. 8 is another conceptual diagram illustrating positions of spatial merge candidate blocks in another asymmetric partitioning mode according to the present invention.

As shown in FIG. 8, a coding unit is partitioned into two asymmetric prediction blocks P0 and P1 and the partitioning mode is a 2N×nU mode. The size of the block P0 is 2N×hN and the size of the block P1 is 2N×(2−h)N. The value of h is ½. The current block is the block P1. The blocks A, B, C, D and E are spatial merge candidate blocks. The block P0 is the spatial merge candidate block B.

In present invention, the spatial merge candidate B is set as unavailable not to be listed on the merge candidate list. Also, the spatial merge candidate block C, D or E having the same motion information of the spatial merge candidate block B is set as unavailable.

Figure 9:
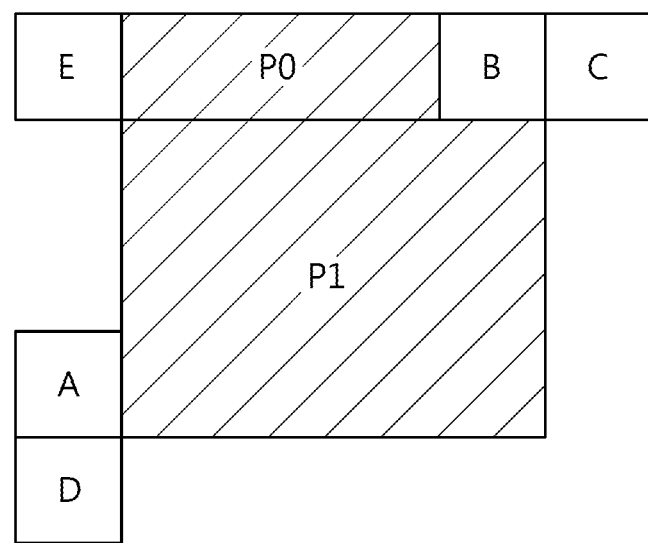
FIG. 9 is another conceptual diagram illustrating positions of spatial merge candidate blocks in another asymmetric partitioning mode according to the present invention.

FIG. 9 is another conceptual diagram illustrating positions of spatial merge candidate blocks in another asymmetric partitioning mode according to the present invention.

As shown in FIG. 9, a coding unit is partitioned into two asymmetric prediction blocks P0 and P1 and the partitioning mode is a 2N×nD mode. The size of the block P0 is 2N×(2−h)N and the size of the block P1 is 2N×hN. The value of h is ½. The current block is the block P1. The blocks A, B, C, D and E are spatial merge candidate blocks. The block P0 is the spatial merge candidate block B.

In present invention, the spatial merge candidate B is set as unavailable not to be listed on the merge candidate list. Also, the spatial merge candidate block C, D or E having the same motion information of the spatial merge candidate block B is set as unavailable.

The spatial merge candidate may also be set as unavailable based on merge area. If the current block and the spatial merge candidate block belong to same merge area, the spatial merge candidate block is set as unavailable. The merge area is a unit area in which motion estimation is performed and information specifying the merge area is included in a bit stream.

A temporal merge candidate is derived (S220). The temporal merge candidate includes a reference picture index and a motion vector of the temporal merge candidate.

The reference picture index of the temporal merge candidate may be derived using one or more reference picture indexes of neighboring block. For example, one of the reference picture indexes of a left neighboring block, an above neighboring block and a corner neighboring block is set as the reference picture index of the temporal merge candidate. The corner neighboring block is one of an above-right neighboring block, a left-below neighboring block and an above-left neighboring block. Alternatively, the reference picture index of the temporal merge candidate may be set to zero to reduce the complexity.

The motion vector of the temporal merge candidate may be derived as follows.

First, a temporal merge candidate picture is determined. The temporal merge candidate picture includes a temporal merge candidate block. One temporal merge candidate picture is used within a slice. A reference picture index of the temporal merge candidate picture may be set to zero.

If the current slice is a P slice, one of the reference pictures of the reference picture list 0 is set as the temporal merge candidate picture. If the current slice is a B slice, one of the reference pictures of the reference picture lists 0 and 1 is set as the temporal merge candidate picture. A list indicator specifying whether the temporal merge candidate picture belongs to the reference picture lists 0 or 1 is included in a slice header if the current slice is a B slice. The reference picture index specifying the temporal merge candidate picture may be included in the slice header.

Figure 10:
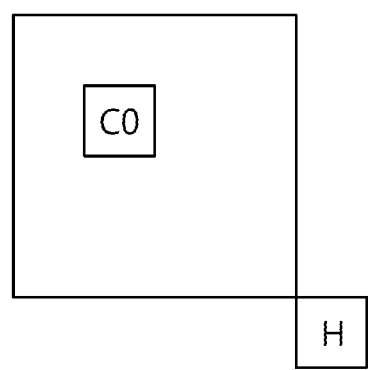
FIG. 10 is a conceptual diagram illustrating position of temporal merge candidate block according to the present invention.

Next, the temporal merge candidate block is determined. FIG. 10 is a conceptual diagram illustrating position of temporal merge candidate block according to the present invention. As shown in FIG. 10, a first candidate block may be a right-below corner block (block H) of the block C. The block C has same size and same location of the current block and is located within the temporal merge candidate picture. A second candidate block is a block covering an upper-left pixel of the center of the block C.

The temporal merge candidate block may be the first candidate block or the second candidate block. If the first candidate block is available, the first candidate block is set as the temporal merge candidate block. If the first candidate block is unavailable, the second candidate block is set as the temporal merge candidate block. If the second candidate block is unavailable, the temporal merge candidate block is set as unavailable.

The temporal merge candidate block is determined based on the position of the current block. For example, if the current block is adjacent to a lower LCU (that is, if the first candidate block belongs to a lower LCU), the first candidate block may be changed into a block within a current LCU or is set as unavailable.

Also, the first and second candidate blocks may be changed into another block based on each position of the candidate block within a motion vector storing unit. The motion vector storing unit is a basic unit storing motion information of reference pictures.

Figure 11:
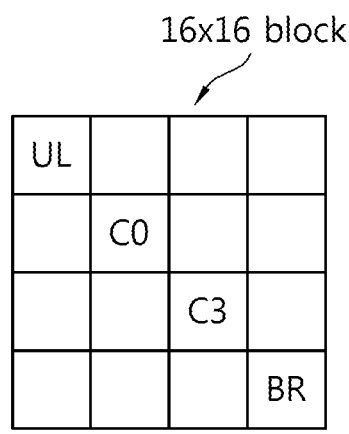
FIG. 11 is a conceptual diagram illustrating a method of storing motion information according to the present invention.

FIG. 11 is a conceptual diagram illustrating a method of storing motion information according to the present invention. As shown in FIG. 11, the motion storing unit may be a 16×16 block. The motion vector storing unit may be divided into sixteen 4×4 bocks. If the motion vector storing unit is a 16×16 block, the motion information is stored per the motion vector storing unit. If the motion vector storing unit includes multiple prediction units of reference picture, motion information of a predetermined prediction unit of the multiple prediction units is stored in memory to reduce amount of motion information to be stored in memory. The predetermined prediction unit may be a block covering one of the sixteen 4×4 blocks. The predetermined prediction unit may be a block covering a block C3, a block BR. Or the predetermined prediction unit may be a block covering a block UL.

Therefore, if the candidate block does not include the predetermined block, the candidate block is changed into a block including the predetermined block.

If the temporal merge candidate block is determined, the motion vector of the temporal merge candidate block is set as the motion vector of the temporal merge candidate.

A merge candidate list is constructed (S230). The available spatial candidates and the available temporal candidate are listed in a predetermined order. The spatial merge candidates are listed up to four in the order of A, B, C, D and E. The temporal merge candidate may be listed between B and C or after the spatial candidates.

It is determined whether one or more merge candidates are generated or not (S240). The determination is performed by comparing the number of merge candidates listed in the merge candidate list with a predetermined number of the merge candidates. The predetermined number may be determined per picture or slice.

If the number of merge candidates listed in the merge candidate list is smaller than a predetermined number of the merge candidates, one or more merge candidates are generated (S250). The generated merge candidate is listed after the last available merge candidate.

If the number of available merge candidates is equal to or greater than 2, one of two available merge candidates has list 0 motion information and the other has list 1 motion information, the merge candidate may be generated by combining the list 0 motion information and the list 1 motion information. Multiple merge candidates may be generated if there are multiple combinations.

One or more zero merge candidates may be added to the list. If the slice type is P, the zero merge candidate has only list 0 motion information. If the slice type is B, the zero merge candidate has list 0 motion information and list 1 motion information.

A merge predictor is selected among the merge candidates of the merge list, a merge index specifying the merge predictor is encoded (S260).

Figure 12:
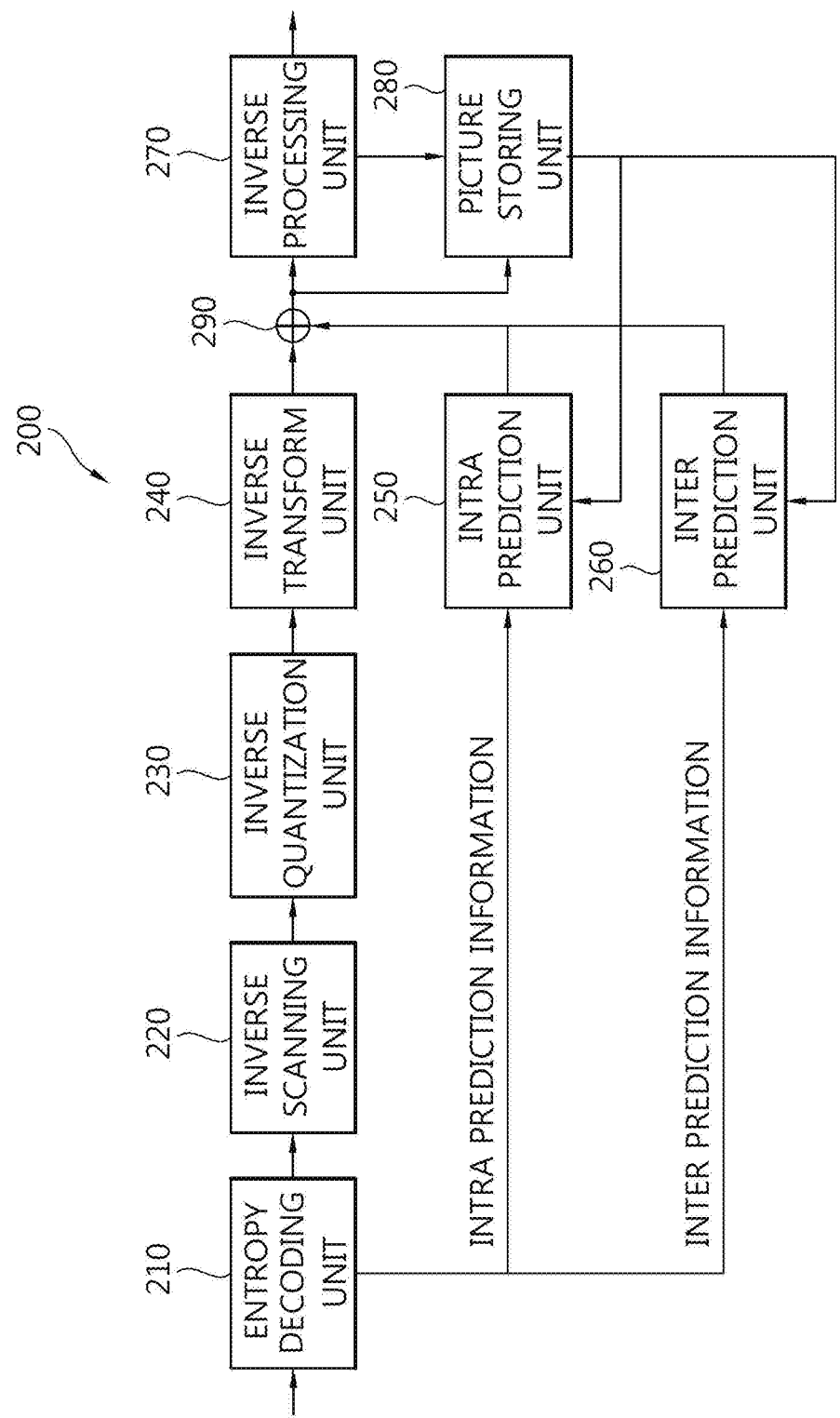
FIG. 12 is a block diagram of an image decoding apparatus 200 according to the present invention.

FIG. 12 is a block diagram of an image decoding apparatus 200 according to the present invention.

The image decoding apparatus 200 according to the present invention includes an entropy decoding unit 210, an inverse scanning unit 220, an inverse quantization unit 230, an inverse transform unit 240, an intra prediction unit 250, an inter prediction unit 260, a post-processing unit 270, a picture storing unit 280 and an adder 290.

The entropy decoding unit 210 extracts the intra prediction information, the inter prediction information and the quantized coefficient components from a received bit stream using a context-adaptive binary arithmetic decoding method.

The inverse scanning unit 220 applies an inverse scan pattern to the quantized coefficient components to generate quantized block. In inter prediction, the inverse scan pattern is a diagonal scan. The quantized coefficient components include the significant flags, the coefficient signs and the coefficients levels.

When the size of the transform unit is larger than the a predetermined size, the significant flags, the coefficient signs and the coefficients levels are inversely scanned in the unit of subset using the diagonal scan to generate subsets, and the subsets are inversely scanned using the diagonal scan to generate the quantized block. The predetermined size is equal to the size of the subset. The subset is a 4×4 block including 16 transform coefficients. The significant flags, the coefficient signs and the coefficient levels are inversely scanned in the reverse direction. The subsets are also inversely scanned in the reverse direction.

A parameter indicating last non-zero coefficient position and the non-zero subset flags are extracted from the bit stream. The number of encoded subsets is determined based on the parameter indicating last non-zero coefficient position. The non-zero subset flag is used to determine whether the corresponding subset has at least one non-zero coefficient. If the non-zero subset flag is equal to 1, the subset is generated using the diagonal scan. The first subset and the last subset are generated using the inverse scan pattern.

The inverse quantization unit 230 receives the differential quantization parameter from the entropy decoding unit 210 and generates the quantization parameter predictor to generate the quantization parameter of the coding unit. The operation of generating the quantization parameter predictor is the same as the operation of the quantization unit 150 of FIG. 1. Then, the quantization parameter of the current coding unit is generated by adding the differential quantization parameter and the quantization parameter predictor. If the differential quantization parameter for the current coding unit is not transmitted from an encoding side, the differential quantization parameter is set to zero.

The inverse quantization unit 230 inversely quantizes the quantized block.

The inverse transform unit 240 inversely transforms the inverse-quantized block to generate a residual block. An inverse transform matrix is adaptively determined according to the prediction mode and the size of the transform unit. The inverse transform matrix is a DCT-based integer transform matrix or a DST-based integer transform matrix. In inter prediction, the DCT-based integer transforms are used.

The intra prediction unit 250 derives an intra prediction mode of a current prediction unit using the received intra prediction information, and generates a prediction block according to the derived intra prediction mode.

The inter prediction unit 260 derives the motion information of the current prediction unit using the received inter prediction information, and generates a prediction block using the motion information.

The post-processing unit 270 operates the same as the post-processing unit 180 of FIG. 1.

The picture storing unit 280 receives post-processed image from the post-processing unit 270, and stores the image in picture units. A picture may be a frame or a field.

The adder 290 adds the restored residual block and a prediction block to generate a reconstructed block.

Figure 13:
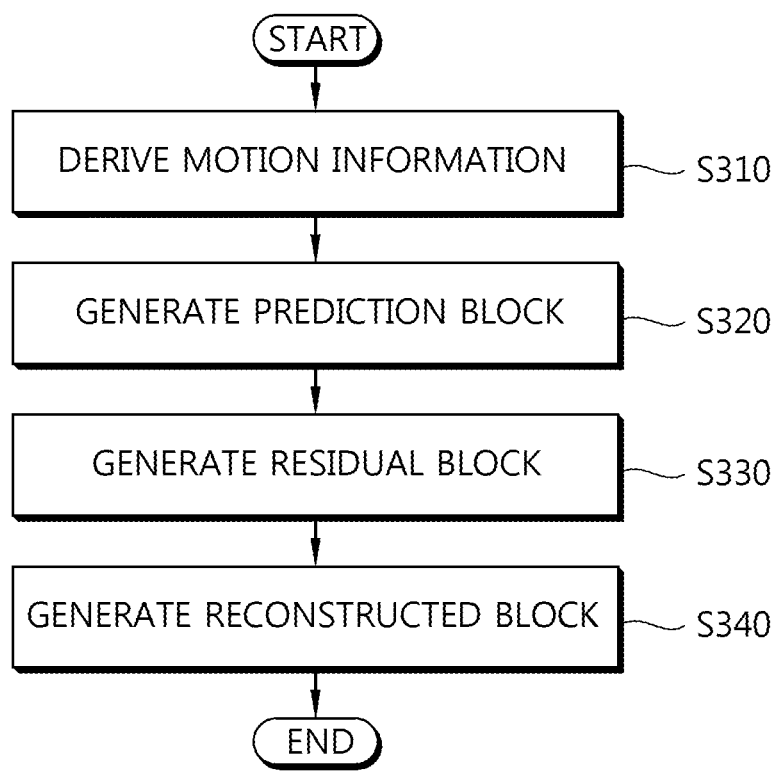
FIG. 13 is a flow chart illustrating a method of decoding an image in inter prediction mode according to the present invention.

FIG. 13 is a flow chart illustrating a method of decoding an image in inter prediction mode according to the present invention.

Motion information of a current block is derived (S310). The current block is a prediction unit. A size of the current block is determined by the size of the coding unit and the partitioning mode.

The motion information varies according to a prediction type. If the prediction type is a uni-directional prediction, the motion information includes a reference index specifying a picture of a reference list 0, and a motion vector. If the prediction type is a bi-directional prediction, the motion information includes a reference index specifying a picture of a reference list 0, a reference index specifying a picture of a reference list 1, and a list 0 motion vector and a list 1 motion vector.

The motion information is adaptively decoded according the coding mode of the motion information. The coding mode of the motion information is determined by a skip flag and a merge flag. If the skip flag is equal to 1, the merge flag does not exist and the coding mode is a skip mode. If the skip flag is equal to 0 and the merge flag is equal to 1, the coding mode is a merge mode. If the skip flag and the merge flag are equal to 0, the coding mode is an AMVP mode.

A prediction block of the current block is generated using the motion information (S320).

If the motion vector indicates an integer-pixel location, the prediction block is generated by copying a block of the reference picture specified by the motion vector. If the motion vector indicates a sub-pixel location, the prediction block is generated by interpolating the pixels of the reference picture. The motion vector is given in quarter-pixel units.

As shown in FIG. 3, the pixels labeled with L0, R0, R1, L1, A0 and B0 are integer position pixels of the reference picture and the pixels labeled with $a_{L0}$ to $r_{L0}$ at sub-pixel locations are fractional pixels to be interpolated using an interpolation filter which is selected based on the motion vector.

If a pixel to be interpolated is located at a sub-pixel location $a_{L0}$, $b_{L0}$ or $c_{L0}$, the pixel labeled with $a_{L0}$, $b_{L0}$ or $c_{L0}$ is generated by applying an interpolation filter to horizontally nearest integer position pixels. If a pixel to be interpolated is located at a sub-pixel location $d_{L0}$, $h_{L0}$ or $n_{L0}$, the pixel labeled with $d_{L0}$, $h_{L0}$ or $n_{L0}$ is generated by applying an interpolation filter to vertically nearest integer position pixels. If a pixel to be interpolated is located at a sub-pixel location $e_{L0}$, $i_{L0}$ or $p_{L0}$, the pixel labeled with $e_{L0}$, $i_{L0}$ or $p_{L0}$ is generated by applying an interpolation filter to vertically nearest interpolated pixels each of which includes a character 'a' within its label. If a pixel to be interpolated is located at a sub-pixel location $g_{L0}$, $k_{L0}$ or $r_{L0}$, the pixel labeled with $g_{L0}$, $k_{L0}$ or $r_{L0}$ is generated by applying an interpolation filter to vertically nearest interpolated pixels each of which includes a character 'c' within its label. If a pixel to be interpolated is located at a sub-pixel location $f_{L0}$, $j_{L0}$ or $q_{L0}$, the pixel labeled with $f_{L0}$, $j_{L0}$ or $q_{L0}$ is generated by applying an interpolation filter to vertically neighboring interpolated pixels each of which includes a character 'c' within its label.

The interpolation filter is determined based on the sub-pixel location of the pixel to be interpolated, or based on a prediction mode and a sub-pixel location of the pixel to be interpolated.

As shown in Table 1, in uni-directional prediction, 6-tap symmetry filter may be used to interpolate pixels of half-pixel location H, and 5-tap asymmetry filter may be used to interpolate pixels of quarter-pixel location FL or FR. In bi-directional prediction, 8-tap symmetry filter may be used for the half-pixel location H and 8-tap asymmetry filter may be used for the quarter-pixel location FL and FR.

Alternatively, the filter may be determined by only the sub-pixel location of the pixel to be interpolated. In uni-directional prediction, 8-tap symmetry filter may be used to interpolate pixels of half-pixel locations and 7-tap asymmetry filter or 6-tap may be used to interpolate pixels of quarter-pixel locations. In bi-directional prediction, same filter or another filter having smaller number of taps may be used to interpolate pixels of sub-pixel locations.

A residual block is generated (S330). The residual block is generated by the entropy decoding unit 210, the inverse scanning unit 220, the inverse quantization unit 230 and the inverse transform unit 240 of FIG. 12.

A reconstructed block is generated using the prediction block and the residual block (S340).

The prediction block has the same size of the prediction unit, and the residual block has the same size of the transform unit. Therefore, the residual signals and the prediction signals of same size are added to generate reconstructed signals.

Figure 14:
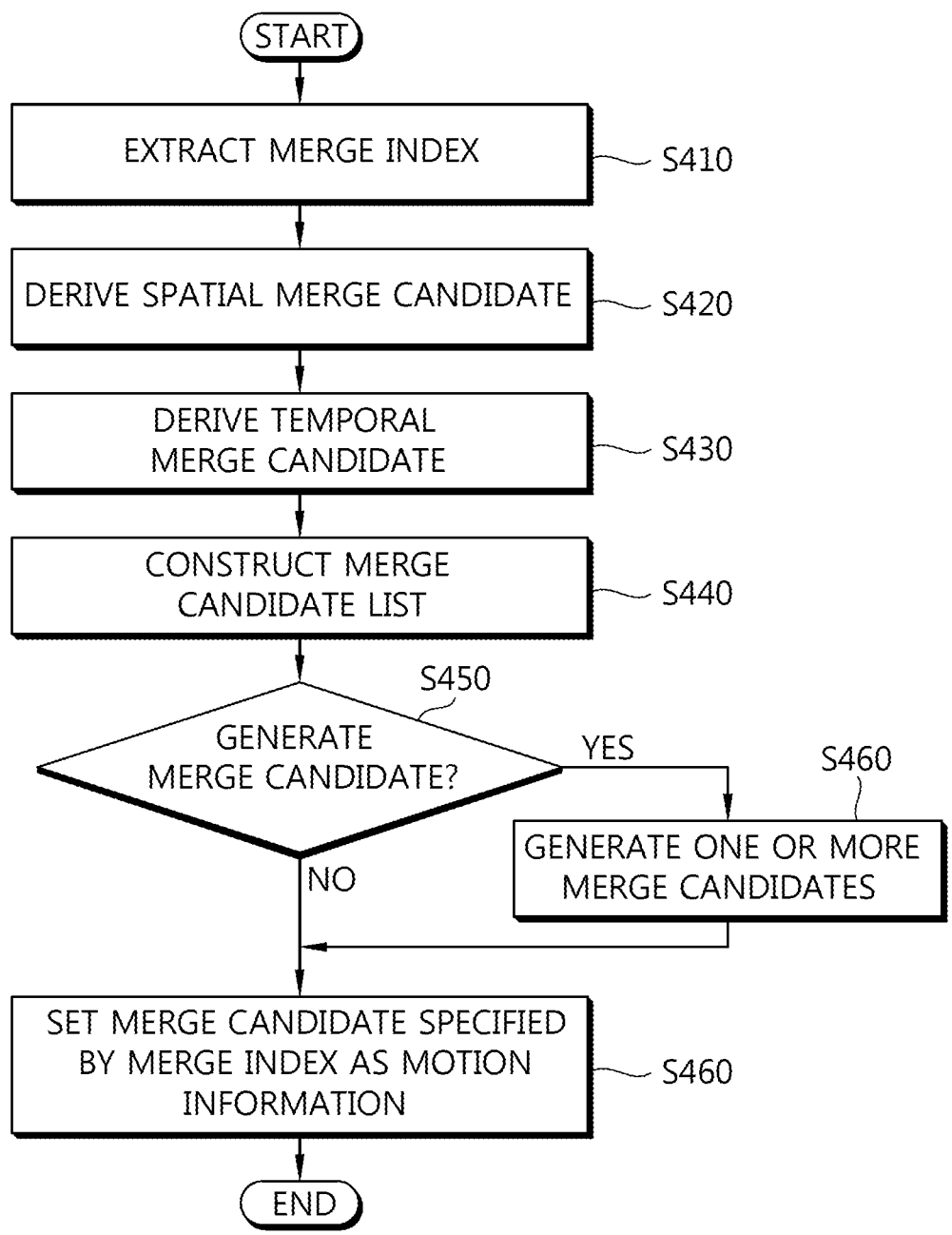
FIG. 14 is a flow chart illustrating a method of deriving motion information in merge mode.

FIG. 14 is a flow chart illustrating a method of deriving motion information in merge mode.

A merge index is extracted from a bit stream (S410). If the merge index does not exist, the number of merge candidates is set to one.

Spatial merge candidates are derived (S420). The available spatial merge candidates are the same as describe in S210 of FIG. 4.

A temporal merge candidate is derived (S430). The temporal merge candidate includes a reference picture index and a motion vector of the temporal merge candidate. The reference index and the motion vector of the temporal merge candidate are the same as described in S220 of FIG. 4.

A merge candidate list is constructed (S440). The merge list is the same as described in S230 of FIG. 4.

It is determined whether one or more merge candidates are generated or not (S450). The determination is performed by comparing the number of merge candidates listed in the merge candidate list with a predetermined number of the merge candidates. The predetermined number is determined per picture or slice.

If the number of merge candidates listed in the merge candidate list is smaller than a predetermined number of the merge candidates, one or more merge candidates are generated (S460). The generated merge candidate is listed after the last available merge candidate. The merge candidate is generated as the same method described in S250 of FIG. 4.

The merge candidate specified by the merge index is set as the motion information of the current block (S470).

Figure 15:
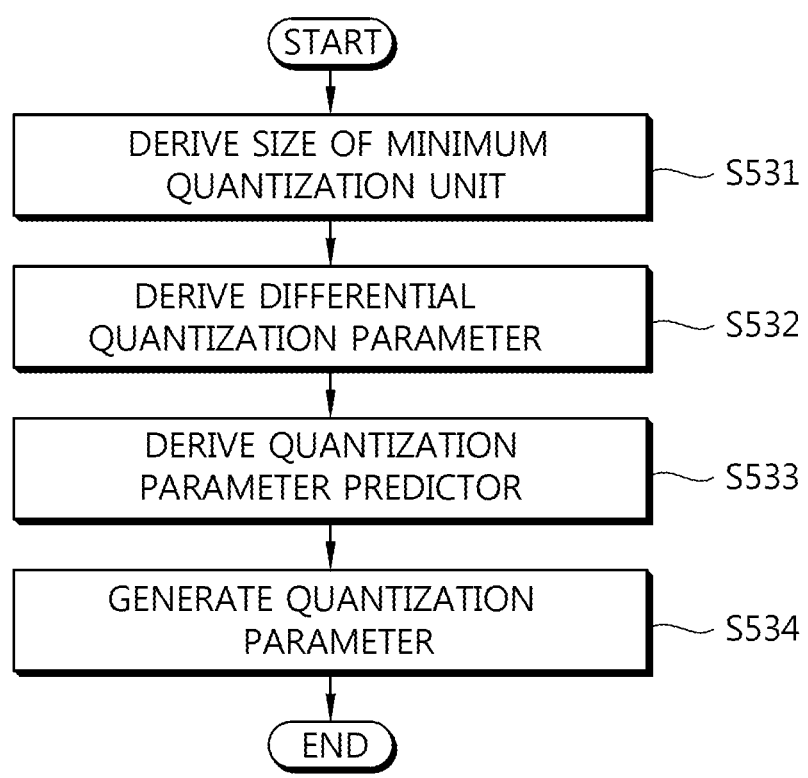
FIG. 15 is a flow chart illustrating a procedure of generating a residual block in inter prediction mode according to the present invention.

FIG. 15 is a flow chart illustrating a procedure of generating a residual block in inter prediction mode according to the present invention.

Quantized coefficient components are generated by the entropy decoding unit (S510).

A quantized block is generated by inversely scanning the quantized coefficient components according to the diagonal scan (S520). The quantized coefficient components include the significant flags, the coefficient signs and the coefficients levels.

When the size of the transform unit is larger than the a predetermined size, the significant flags, the coefficient signs and the coefficients levels are inversely scanned in the unit of subset using the diagonal scan to generate subsets, and the subsets are inversely scanned using the diagonal scan to generate the quantized block. The predetermined size is equal to the size of the subset. The subset is a 4×4 block including 16 transform coefficients. The significant flags, the coefficient signs and the coefficient levels are inversely scanned in the reverse direction. The subsets are also inversely scanned in the reverse direction.

The parameter indicating last non-zero coefficient position and the non-zero subset flags are extracted from the bit stream. The number of encoded subsets is determined based on the parameter indicating last non-zero coefficient position. The non-zero subset flags are used to determine whether the subset has at least one non-zero coefficient. If the non-zero subset flag is equal to 1, the subset is generated using the diagonal scan. The first subset and the last subset are generated using the inverse scan pattern.

The quantized block is inversely quantized using an inverse quantization matrix and a quantization parameter (S530).

A minimum size of quantization unit is determined. A parameter cu_qp_delta_enabled_info specifying the minimum size is extracted from a bit stream, and the minimum size of the quantization unit is determined by the following equation.

Log 2(MinQUSize)=Log 2(MaxCUSize)−cu_qp_delta_enabled_info

The MinQUSize indicates the minimum size of the quantization unit, the MaxCUSize indicates the size of LCU. The parameter cu_qp_delta_enabled_info is extracted from a picture parameter set.

A differential quantization parameter of the current coding unit is derived. The differential quantization parameter is included per quantization unit. Therefore, if the size of the current coding unit is equal to or larger than the minimum size of the quantization unit, the differential quantization parameter for the current coding unit is restored. If the differential quantization parameter does not exist, the differential quantization parameter is set to zero. If multiple coding units belong to a quantization unit, the first coding unit containing at least one non-zero coefficient in the decoding order contains the differential quantization unit.

A coded differential quantization parameter is arithmetically decoded to generate bin string indicating the absolute value of the differential quantization parameter and a bin indicating the sign of the differential quantization parameter. The bin string may be a truncated unary code. If the absolute value of the differential quantization parameter is zero, the bin indicating the sign does not exist. The differential quantization parameter is derived using the bin string indicating the absolute value and the bin indicating the sign.

A quantization parameter predictor of the current coding unit is derived. The quantization parameter predictor is generated by using quantization parameters of neighboring coding units and quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameter are available, the average of the left and above quantization parameter is set as the quantization parameter predictor. If only one of the left and above quantization parameter is available, the average of the available quantization parameter and the previous quantization parameter is set as the quantization parameter predictor. If both of the left and above quantization parameter are unavailable, the previous quantization parameter is set as the quantization parameter predictor.

If multiple coding units belong to a quantization unit of minimum size, the quantization parameter predictor for the first coding unit in decoding order is derived and used for the other coding units.

The quantization parameter of the current coding unit is generated using the differential quantization parameter and the quantization parameter predictor.

A residual block is generated by inverse-transforming the inverse-quantized block (S540). One dimensional horizontal and vertical inverse DCT based-transforms are used.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of decoding video data in uni-directional prediction by a decoding apparatus, the method comprising:
deriving, by the decoding apparatus, a reference picture index and a motion vector of a current prediction unit;
generating, by the decoding apparatus, a prediction block of the current prediction unit using the reference picture index and the motion vector;
generating, by the decoding apparatus, a quantized block by inversely scanning quantized coefficient components;
generating, by the decoding apparatus, a transformed block by inversely quantizing the quantized block using a quantization parameter;
generating, by the decoding apparatus, a residual block by inversely transforming the transformed block; and
generating, by the decoding apparatus, reconstructed pixels using the prediction block and the residual block,
wherein prediction pixels of the prediction block are generated using an interpolation filter selected based on the motion vector where the number of taps of the interpolation filter is determined by the prediction pixel position indicated by the motion vector, the interpolation filter being a 7-tap filter if the motion vector indicates a quarter pixel position, the interpolation filter being an 8-tap filter if the motion vector indicates a half pixel position,
wherein the quantization parameter is derived by adding a differential quantization parameter and a quantization parameter predictor, when only one of a left quantization parameter and an above quantization parameter is available, the quantization parameter predictor is an average of a previous quantization parameter and the available one of the left quantization parameter and the above quantization parameter, and when both of the left quantization parameter and the above quantization parameter are unavailable, the previous quantization parameter is set as the quantization parameter predictor,
wherein the differential quantization parameter is restored using a bin string indicating an absolute value of the differential quantization parameter and a bin indicating a sign of the differential quantization parameter, and
wherein the quantization parameter is derived per quantization unit, and a size of the quantization unit is one of allowable sizes of a coding unit.

2. The method of claim 1, wherein the reference picture index of the current prediction unit is a reference picture index of a spatial or temporal merge candidate specified by a merge index and the motion vector of the current prediction unit is a motion vector of the spatial or temporal merge candidate specified by the merge index, and
if the current prediction unit is a second prediction unit partitioned by asymmetric partitioning, the spatial merge candidate corresponding to a first prediction unit partitioned by the asymmetric partitioning is set as unavailable.

3. The method of claim 2, wherein if a size of the current prediction unit is (3/2)N×2N, the left spatial merge candidate is set as unavailable.

4. The method of claim 2, wherein a motion vector of the temporal merge candidate is a motion vector of a temporal merge candidate block within a temporal merge candidate picture, and a position of the temporal merge candidate block is determined depending on a position of the current block within a largest coding unit (LCU).

5. A method of encoding video data in uni-directional prediction by an encoding apparatus, the method comprising:
determining, by the encoding apparatus, a reference picture index and a motion vector of a current prediction unit;
generating, by the encoding apparatus, a prediction block with the reference picture index and the motion vector;
generating, by the encoding apparatus, a residual block with the prediction block;
generating, by the encoding apparatus, a transformed block by transforming the residual block;
generating, by the encoding apparatus, a quantized block by quantizing the transformed block using a quantization parameter; and
generating, by the encoding apparatus, quantized coefficient components by scanning the quantized block,
wherein prediction pixels of the prediction block are generated using an interpolation filter selected based on the motion vector where the number of taps of the interpolation filter is determined by the prediction pixel position indicated by the motion vector, the interpolation filter being a 7-tap filter if the motion vector indicates a quarter pixel position, the interpolation filter being an 8-tap filter if the motion vector indicates a half pixel position,
wherein the quantization parameter is derived per quantization unit, and a size of the quantization unit is one of allowable sizes of a coding unit,
wherein a differential quantization parameter is generated by subtracting a quantization parameter predictor from the quantization parameter, when only one of a left quantization parameter and an above quantization parameter is available, the quantization parameter predictor is an average of a previous quantization parameter and the available one of the left quantization parameter and the above quantization parameter, and when both of the left quantization parameter and the above quantization parameter are unavailable, the previous quantization parameter is set as the quantization parameter predictor, and
wherein the differential quantization parameter is encoded into a bin string indicating an absolute value of the differential quantization parameter and a bin indicating a sign of the differential quantization parameter.

6. The method of claim 5, wherein the reference picture index is a reference picture index of a spatial or temporal merge candidate specified by a merge index and the motion vector is a motion vector of the spatial or temporal merge candidate specified by the merge index, and
   if the current prediction unit is a second prediction unit partitioned by asymmetric partitioning, the spatial merge candidate corresponding to a first prediction unit partitioned by the asymmetric partitioning is set as unavailable.

7. The method of claim 6, wherein if a size of the current prediction unit is (3/2)N×2N, the left spatial merge candidate is set as unavailable.

8. The method of claim 6, wherein a motion vector of the temporal merge candidate is a motion vector of a temporal merge candidate block within a temporal merge candidate picture, and a position of the temporal merge candidate block is determined depending on a position of the current block within a largest coding unit (LCU).

9. A non-transitory computer-readable storage medium storing encoded video information, comprising:
   a bit stream stored in the computer-readable storage medium, the bit stream comprising entropy-encoded information on a reference picture index, a motion vector and a quantized coefficients,
   wherein the quantized coefficients is generated by quantizing a transformed residual block using a quantization parameter, and the transformed residual block is generated by transforming a residual block which is generated based on a prediction block, and the prediction block is generated using the reference picture index and the motion vector,
   wherein prediction pixels of the prediction block are generated using an interpolation filter selected based on the motion vector where the number of taps of the interpolation filter is determined by the prediction pixel position indicated by the motion vector, the interpolation filter being a 7-tap filter if the motion vector indicates a quarter pixel position, the interpolation filter being an 8-tap filter if the motion vector indicates a half pixel position,
   wherein the quantization parameter is derived per quantization unit, and a size of the quantization unit is one of allowable sizes of a coding unit,
   wherein a differential quantization parameter is generated by subtracting a quantization parameter predictor from the quantization parameter, when only one of a left quantization parameter and an above quantization parameter is available, the quantization parameter predictor is an average of a previous quantization parameter and the available one of the left quantization parameter and the above quantization parameter, and when both of the left quantization parameter and the above quantization parameter are unavailable, the previous quantization parameter is set as the quantization parameter predictor, and
   wherein the differential quantization parameter is encoded into a bin string indicating an absolute value of the differential quantization parameter and a bin indicating a sign of the differential quantization parameter.

* * * * *